(12) United States Patent
Schneider

(10) Patent No.: US 8,533,474 B2
(45) Date of Patent: Sep. 10, 2013

(54) GENERATING SESSION KEYS

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1322 days.

(21) Appl. No.: 12/038,295

(22) Filed: Feb. 27, 2008

(65) Prior Publication Data
US 2009/0214028 A1     Aug. 27, 2009

(51) Int. Cl.
*H04L 9/32* (2006.01)

(52) U.S. Cl.
USPC .......... 713/171; 713/168; 713/169; 713/170; 380/44; 380/255; 380/259; 380/277

(58) Field of Classification Search
USPC ............ 380/44, 28, 255, 259, 260, 262, 277, 380/278, 283; 713/168–171, 178, 181
See application file for complete search history.

(56) References Cited

U.S. PATENT DOCUMENTS

| | | | | |
|---|---|---|---|---|
| 5,491,750 | A * | 2/1996 | Bellare et al. | 713/155 |
| 6,038,322 | A * | 3/2000 | Harkins | 380/279 |
| 7,096,356 | B1 * | 8/2006 | Chen et al. | 713/163 |
| 7,478,434 | B1 * | 1/2009 | Hinton et al. | 726/27 |
| 7,487,359 | B2 * | 2/2009 | Peyravian et al. | 713/178 |
| 8,156,332 | B2 * | 4/2012 | Simon | 713/168 |
| 2002/0174332 | A1 * | 11/2002 | Vialen et al. | 713/152 |
| 2003/0065956 | A1 * | 4/2003 | Belapurkar et al. | 713/202 |
| 2003/0172278 | A1 * | 9/2003 | Farnham et al. | 713/176 |
| 2003/0210789 | A1 * | 11/2003 | Farnham et al. | 380/270 |
| 2005/0033703 | A1 * | 2/2005 | Holdsworth | 705/67 |
| 2005/0033960 | A1 * | 2/2005 | Vialen et al. | 713/170 |
| 2006/0050869 | A1 * | 3/2006 | Tuvell et al. | 380/28 |
| 2006/0080546 | A1 * | 4/2006 | Brannon et al. | 713/185 |
| 2006/0179319 | A1 * | 8/2006 | Krawczyk | 713/180 |
| 2007/0083766 | A1 * | 4/2007 | Farnham et al. | 713/176 |
| 2007/0160201 | A1 * | 7/2007 | Blom et al. | 380/30 |
| 2007/0162757 | A1 * | 7/2007 | Mache | 713/176 |
| 2008/0139205 | A1 * | 6/2008 | Sayeedi | 455/436 |
| 2008/0301783 | A1 * | 12/2008 | Abrutyn et al. | 726/5 |
| 2009/0006840 | A1 * | 1/2009 | Birger et al. | 713/151 |
| 2009/0006868 | A1 * | 1/2009 | Alkove et al. | 713/193 |
| 2009/0007265 | A1 * | 1/2009 | Torre et al. | 726/22 |
| 2009/0187757 | A1 * | 7/2009 | Kerschbaum | 713/153 |
| 2010/0031039 | A1 * | 2/2010 | Ciet et al. | 713/168 |

OTHER PUBLICATIONS

"A mutual authentication and key exchange scheme from bilinear pairings for low power computing devices", Y. Tseng, T. Wu, J. Wu, COMPSAC 2007, Jul. 24-27, pp. 1-6.*
"Diffie-Hellman Key Distribution Extended to Group Communication", M. Steiner, G. Tsudik, M. Waidner, CCS 1996, pp. 31-37.*
Perrig et al, "SPINS: Security Protocols for Sensor Networks", 2001, ACM SIGMOBILE Jul. 2001.*

* cited by examiner

*Primary Examiner* — Ashok Patel
*Assistant Examiner* — Daniel Potratz
(74) *Attorney, Agent, or Firm* — Lowenstein Sandler LLP

(57) ABSTRACT

A method and apparatus for generating shared session keys. The method and apparatus does not rely on strong random number generation. The first node sends a timestamp and random sequence to the second node. The second node generates a message authentication code (MAC) using this data and a shared secret key. The MAC is then used to encrypt a reply containing a second timestamp and second random sequence from the second node. The first node receives this message and decrypts it by generating the same MAC. Both nodes then generate a session key using the shared set of timestamps and random sequences.

20 Claims, 4 Drawing Sheets

GENERATING SESSION KEYS

TECHNICAL FIELD

Embodiments of the present invention relate to secured communication over a network. Specifically, the embodiments of the invention provide a method and apparatus for establishing a secure shared session key between two or more computers communicating over an open network.

BACKGROUND

Encrypted communication sessions are used to secure communication between to programs communicating over an open network such as the Internet. Many encrypted communication sessions utilize a session key for the encryption of the data for that communication session. The session key is used as an parameter of the encryption and decryption algorithms at each computer participating in the communication session to prevent a third party from intercepting and decrypting the data in the communication session. A session key is used once for the specific communication session and then discarded to minimize the possibility that a malicious third party would be able to determine the session key.

Session keys are utilized to thwart certain types of cryptanalytic attacks, but in turn present a risk, because the communicating programs must agree on or share the session key over the open network. The session keys are used, because cryptanalytic attacks are made easier over time as more data is encrypted with the same key. Thus, switching session keys with each communication session limits the duration of time that the same key is used to encrypt data.

A secret key is often shared between the communicating computers and programs. The secret key is delivered by a secure method such as direct local input by an administrator or through a similar system. The session keys protect the secret key by minimizing its direct use in encryption that may expose it to cryptanalytic attacks.

Many bulk encryption algorithms require the use of a shared key that is secure. Secret key algorithms have this property. This type of encryption is often the most practical, especially for encrypting large amounts of data efficiently. Secret key algorithms rely on both secret keys and session keys.

Session keys must be chosen such that they are not predictable by a third party. Typically, this involves the generation of a random number or sequence as part of the process. However, the generation of random values can result in predictable results, because random value generation is often based on stored sequences of values in a computer system. If this stored sequence is known by a third party it can undermine the security of the encryption by making the session keys predictable.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Described herein is a method and apparatus for generating shared session keys. The method and apparatus does not rely on strong random number generation. The first node sends a timestamp and random sequence to the second node. The second node generates a message authentication code (MAC) using this data and a shared secret key. The MAC is then used to encrypt a reply containing a second timestamp and second random sequence from the second node. The first node receives this message and decrypts it by generating the same MAC. Both nodes then generate a session key using the shared set of timestamps and random sequences.

Figure 1:
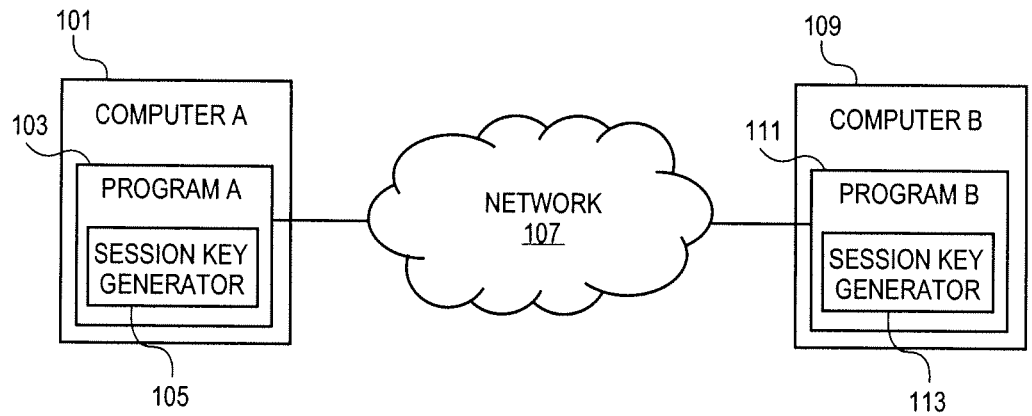
FIG. 1 is a diagram of one embodiment of an encrypted communication system.

FIG. 1 is a diagram of one embodiment of an encrypted communication system. The system includes a first node or computer A 101 that communicates over a network 107 with a second node or computer B 109. The first computer A 101 may execute a program A 103 or include a component that establishes a communication session with a corresponding program B 111 or component on the second computer B 107. Program A 103 and program B 111 each include a session key generation component 105, 113. The two session key generation components 105, 113 are complementary and share a process to generate identical session keys securely.

The first computer A 101 and second computer B 109 can be any type of computers capable of communicating over a network 107. Computer A 101 and computer B 109 can be desktop computers, console devices, servers, handheld devices, network appliances or similar computing devices. Computer A 101 and computer B 109 can be different types of devices for example computer A 101 can be a desktop computer that communicates with a network device such as a wireless router. The network 107 can be any type or combination of network types including a local area network (LAN) a wide area network (WAN), such as the Internet or similar networks. The network 107 can include wireless and/or wireline segments.

The program A 103 and program B 111 can be any type of program or component capable of establishing a communication session over a network. For example, the program A 103 and program B 111 could be a browser and web server, respectively. The program A 103 and program B 111 can have a client-server, peer-to-peer or similar relationship. The program A 103 and program B 111 may encrypt all data or a portion of the data in the communication session. Each program may include or have access to a session key generation component 105, 113.

In one embodiment, the session key generation components 105, 113 are a part of the programs A 101 and B 107. In another embodiment, the session key generation components 105, 113 are separate components accessible to any number of programs. The session key generation components handle the protocol of establishing a session key for encrypting data over a communication session between two programs. In one embodiment, the session key generation components 105, 113 may be identical and both capable of initiating and responding to the process as discussed below in regard to FIGS. 2 and 3. In another embodiment, the two processes may be performed by separate and distinct components. For sake of clarity, the embodiment where both processes are performed by a single component is described herein. However, one skilled in the art would understand that the principles, operations and processes described herein would also be applicable to other configurations and embodiments.

Figure 2:
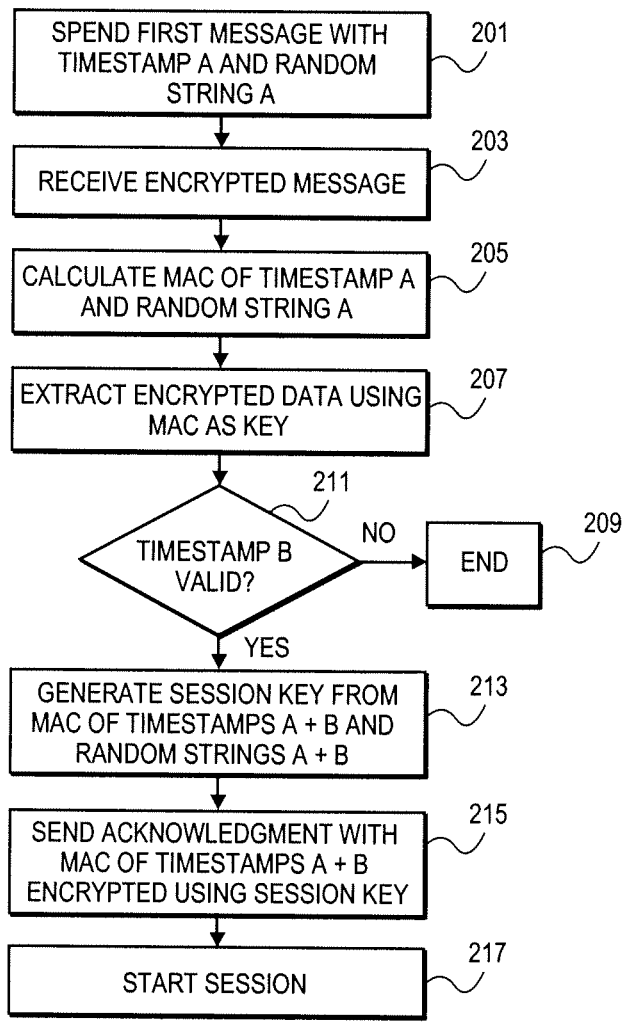
FIG. 2 is a flowchart of one embodiment of process for session key generation for a first node in the system.

FIG. 2 is a flowchart of one embodiment of a process for session key generation for a first node in the system. In one embodiment, the session key generation process is initiated by a first node sending a message to the second node that includes a timestamp A and a random string A (block 201). The timestamp A can have any format and any degree of precision. For example, the timestamp A may indicate 05:00:00 (GMT) or have a greater level of detail by including a date Feb. 15, 2009 and similar information. The random string A can be any alphanumeric sequence having any length and generated using any methodology including using a specific sequence. The session key generation process does not rely on the strength of the random string. The random string A must only be unique to the utilized timestamp A. This data is sent in a message unencrypted, i.e., in the clear. The process then waits for a response from the second node.

The response received from the second node is an encrypted message. Any type of encryption algorithm can be used including DES, AES, RC4 and similar encryption algorithms (block 203). The first node generates a message authentication code (MAC) using the timestamp A and random string A, previously sent to the second node using the secret shared key as the key for generating the MAC (block 205). The secret shared key is a key shared with the second node that is distributed by another secure method. Its use is kept to a minimum to protect it from cryptanalytic attack. The protocol relies on the use of this MAC as a key to encrypt the response of the second node. Since the the generation of this MAC is based on the secret shared key, it is secure from a third party. Any algorithm for generating a MAC can be utilized including cryptographic hash functions such as HMAC or block cypher algorithms such as OMAC, PMAC or similar algorithms.

The MAC is then used as a key to decrypt the received message (block 207). The received message contains a timestamp B from the second node along with a random string B from the second node and the original random string A sent originally by the first node. In another embodiment, the original timestamp A sent by the first node is also in the message. Again, the random sequence is not necessarily a strong random string. The random string can even be a part of a sequence. The received timestamp B and randoms string B are secure as they were encrypted by the MAC that was generated using the shared secret key. The received original random string A can be checked to ensure that the received message is in response to the first message and not corrupted or from a malicious third party.

The received timestamp B is checked for validity (block 211). If the reply message has a timestamp B that falls outside a defined tolerance range, then the timestamp B is not considered valid. Any tolerance range can be defined in terms of time delay from the sending of the original message or in relations to timestamp A. An invalid timestamp B may indicate that the reply message was corrupted or damaged and should not be relied on. In some cases it may indicate that a third party is attempting to interfere with the communication session. For example, a malicious third party may be attempting a replay attack. In either case, the reply message should not be relied upon for establishing a session key for the communication session. The session key generation process is aborted (block 209). The random string A and timestamp A sent by the first node may be recorded to ensure that they are not reused.

If the timestamp B is valid, then a session key can be generated (block 213). The session key is generated by generating a new MAC that is generated using the now shared timestamps A and B and random strings A and B from each node as well as the shared secret key as a key. Since, both nodes share all of this information they can generate identical secure session keys for use in symmetrical encryption algorithms. The algorithm used to generate the shared session key can be the same or different from that used to generate the MAC that was the key for the first exchange of messages.

An acknowledgment message is then generated, encrypted and sent to the second node (block 215). The acknowledgment message confirms that the key generation process was successful and allows the communication session to start (block 217). The acknowledgment message can have any content. In one embodiment, the acknowledgment message includes a MAC of both timestamps, which is then encrypted using the generated session key. The acknowledgement message is sent to the second node. In one embodiment, a new timestamp can be included to allow the second node to verify that the key generation process and acknowledgment process have not taken an undue amount of time that may indicate a security problem.

Figure 3:
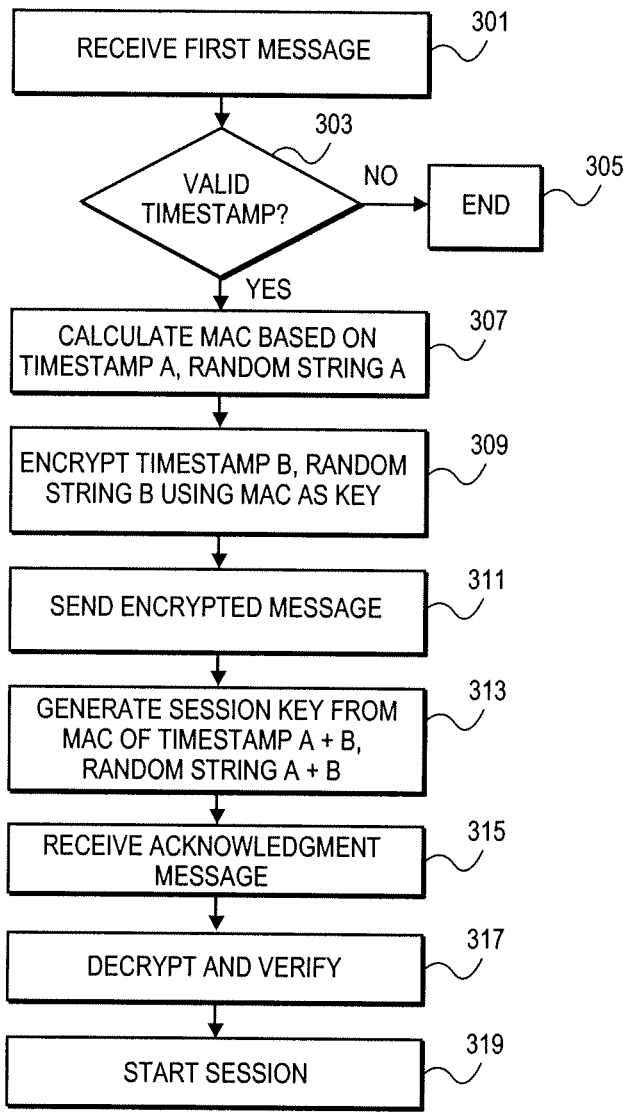
FIG. 3 is a flowchart of one embodiment of process for session key generation for a second node in the system.

FIG. 3 is a flowchart of one embodiment of a process for shared session key generation for a second node in the system. This process is initiated in response to receiving an initial message from the first node in the system (block 301). This message is not encrypted and includes a timestamp A and a random string A. The random string A, as discussed above, does not need to be a strong random sequence. The timestamp A indicates the time that the received message was generated.

The process checks the validity of the timestamp A (block 303). The timestamp A is not valid if it is too old. Any length or threshold duration for timestamp A validity can be set. The threshold can also be dynamic based on the proximity of the first node (e.g., the number of hops) or similar information. If the timestamp A is too old, it may be the result of a third party attempting to interfere and undermines the security of the process to gain access or similarly compromise the communication session. If the timestamp A is invalid, the session key generation process is aborted (block 305).

If the timestamp A is valid, then the received timestamp A and random string A are used along with the shared secret key to generate a MAC (block 307). This MAC will be secure due to the use of the secret key. The MAC is then used as a key to encrypt a new message that includes a timestamp B generated by the second node for this reply message and another random string B also generated for the reply message (block 309). The encrypted message is then sent to the first node (block 311). The two nodes now share two timestamps A and B and two random strings A and B. The timestamp B and random string B from the second node are secret, while the timestamp A and random string A were sent in the clear. However, the combination of these elements provides a sufficient basis for generating a session key that cannot be easily determined by a third party.

A shared session key is then generated using the shared timestamps A and B and random strings A and B from both nodes along with the shared secret key by calculating a MAC using these values as parameters (block 313). An identical MAC can be generated by the first node based on the data sent in the encrypted message thereby establishing a shared session key. The second node then awaits an acknowledgment message from the first node to start the session. In one embodiment, a time-out counter is utilized to abort the session key generation process in the case an acknowledgment is not received. In another embodiment, the second nodes sends an acknowledgment message if it does not receive one within the time period or similarly attempts to confirm the establishment of the shared session keys.

The acknowledgment message is received and decrypted using the shared session key (block 315). The second node decrypts the acknowledgment message to obtain the shared timestamps A and B or random strings A and B. If this data is present in the acknowledgment message then the second node verifies that the session has been properly established and the session key properly generated by both nodes (block 317). In response, the session can then be initiated (block 319).

Figure 4A:
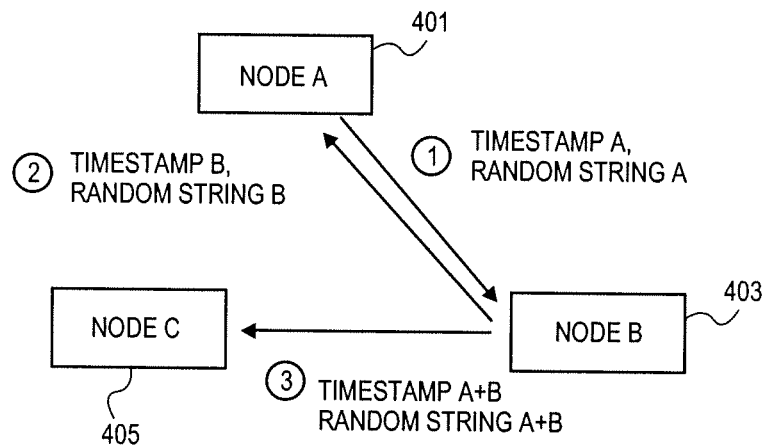
FIGS. 4A-4C are diagrams of a process for multi-node session key generation.
Figure 4B:
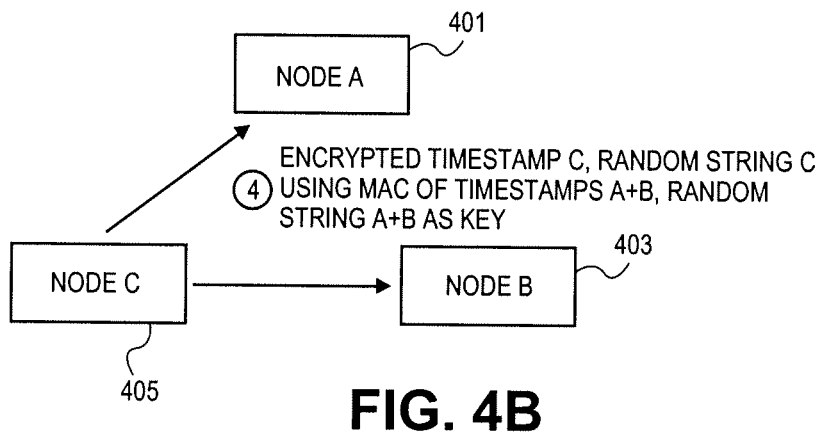
Figure 4C:
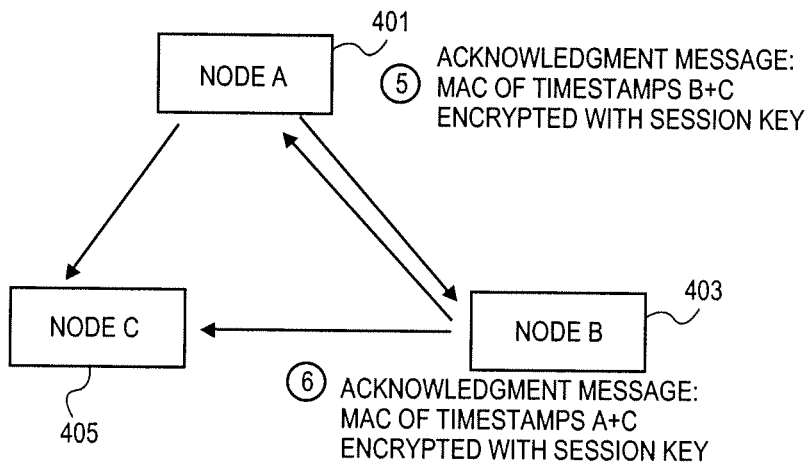

FIGS. 4A-4C are diagrams of a process for multi-node session key generation. The process described above can be modified to allow multiple nodes to participate in the generation of a shared session key. The process can scale to accommodate any number of participating nodes. FIG. 4A depicts a first stage of the multi-node process. The example describes a scenario with three nodes, however, one skilled in the art would understand that the process scales to accommodate any number of nodes. In the first state illustrated in FIG. 4A, the first node A 401 initiates the process by sending a timestamp A and random string A in a message in the clear to the second node B 403. The process of generating and verifying these timestamps by various nodes is analogous to the process for the two node process described above.

The second node 403 receives the timestamp A and random string A and then generates a message for the third node C 405 that includes the timestamp A and random string A. In addition, the message includes a timestamp B and random string B from the second node 403. The second node also sends the timestamp B and random string B to the first node 401. The process of sending messages in this stage is to provide all of the timestamps and random strings from all of the nodes (one set each) except the last node to all of the other nodes.

In the second stage depicted in FIG. 4B, the last node C 405 generates an encrypted message using a key that is a MAC of all of the timestamps and random strings received from all of the other nodes 401, 403 using a shared secret key. The shared secret key is distributed to all of the nodes by another secure distribution method. The MAC is then used as a key to encrypt a message that contains the timestamp C and random string C of the last node 405 that has not been sent in the clear to the other nodes. As a result, all of the nodes receive a full set of timestamps and random strings, one from each of the nodes. Each of the nodes has exchanged in the clear the timestamps and random strings necessary to create the MAC needed to decrypt the encrypted message from the last node 405 that contains the timestamp C and random string C.

FIG. 4C is diagram of the last stage of the process. Each of the nodes except the last node 405 sends acknowledgment messages to each of the other nodes. The acknowledgment messages are generated using a session key derived from the full set of timestamps and random strings exchanged in the last two stages. The acknowledgment message includes encrypted timestamps or random string of the nodes other than the timestamp or random string of the node generating the acknowledgement message. Thus, in the example, the first node A 401 sends an acknowledgment message to the other nodes 403, 405 encrypting the timestamps B and C, while the second node B 403 sends an acknowledgment message to the first node A 401 and last node C 405 encrypting the timestamps A and C. Each node can verify each of the acknowledgment messages and once a valid acknowledgment message has been received from each node except the last node, then the session can be started.

Figure 5:
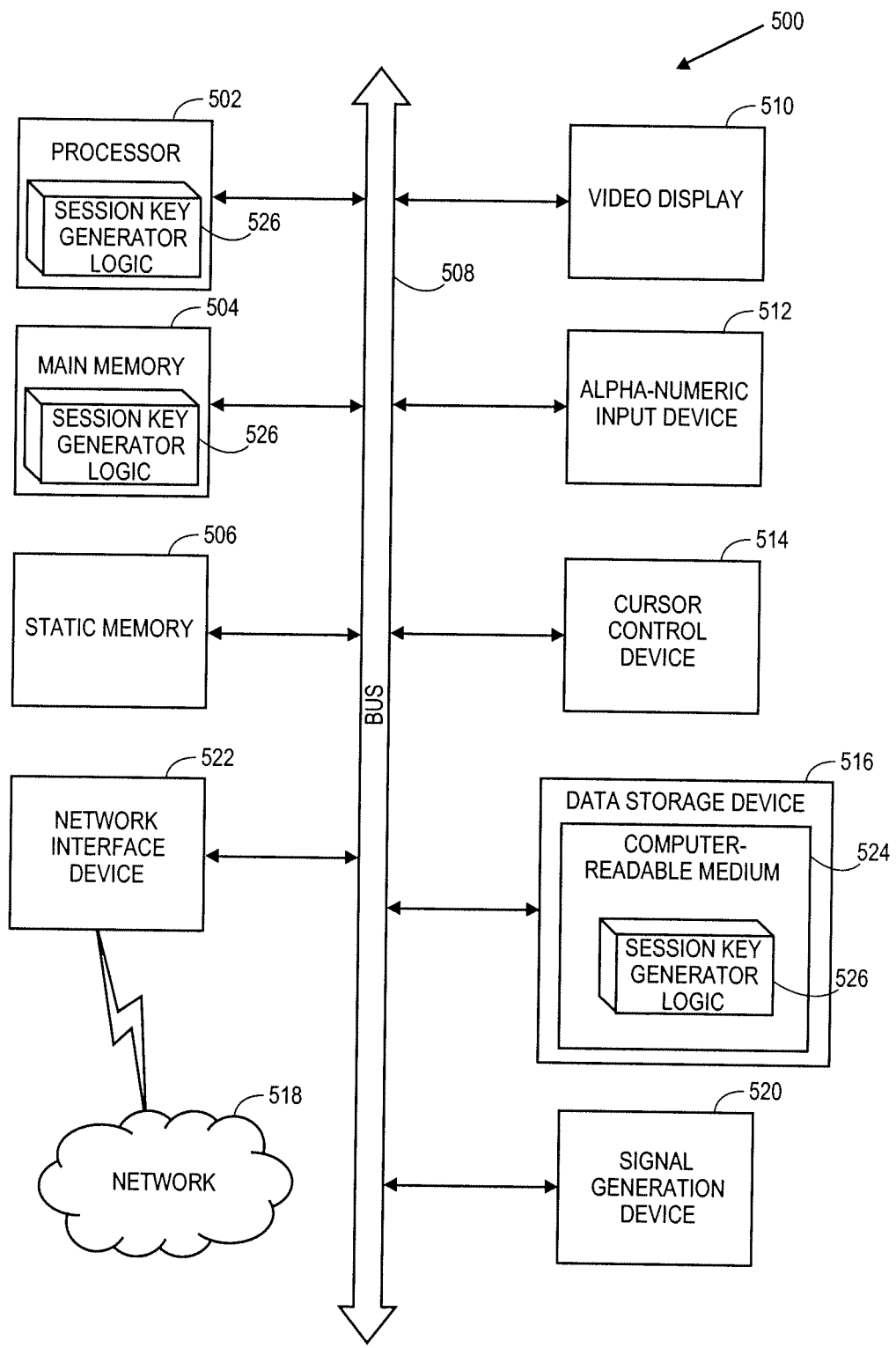
FIG. 5 is a diagram of one embodiment of a computer system providing the session key generation.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine (e.g., the computer executing the session key generator) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 516 (e.g., a data storage device in the form of a drive unit, which may include fixed or removable computer-readable medium), which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the session key generator logic 526 for performing the operations and steps discussed herein.

The computer system 500 may further include a network interface device 522. The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions (e.g., session key generator logic 526) embodying any one or more of the methodologies or functions described herein. The logic 526 may also reside, completely or at least partially, within the main memory 504 and/or within the processing device 502 during execution thereof by the computer system 500, the main memory 504 and the processing device 502 also constituting machine-readable storage media. The logic 526 may further be transmitted or received over a network 518 via the network interface device 522.

The machine-readable storage medium 524 may also be used to store the session key generator logic 526 persistently. While the machine-readable storage medium 524 is shown in an exemplary embodiment to be a single medium, the term "machine-readable storage medium" and also "computer-readable medium" should be taken to include a single medium or multiple media (e.g., a centralized or distributed database, and/or associated caches and servers) that store the one or more sets of instructions. The terms "machine-readable storage medium" and "computer-readable medium" shall also be taken to include any medium that is capable of storing or encoding a set of instructions for execution by the machine and that cause the machine to perform any one or more of the methodologies of the present invention. The terms "machine-readable storage medium" and "computer-readable medium" shall accordingly be taken to include, but not be limited to, solid-state memories, and optical and magnetic media.

In the above description, numerous details are set forth. It would be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be born in mind, however, that all of these and similar terms are to be associated with the appropriate physical quantities and are merely convenient labels applied to these quantities. Unless specifically stated otherwise in the above discussion, it is appreciated that throughout the description, discussions utilizing terms such as "processing," "computing," "generating," "determining," "selecting," "displaying," "searching," "receiving," "updating," "modifying," "assigning," "requesting," "clearing," "running," "committing," "moving," "executing," "closing," "detecting," "initiating," "returning," "sending," "calculating," "decrypting," "encrypting," "ending," "verifying" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein above are not inherently related to any particular computer or other apparatus. Various general purpose systems may be used with programs in accordance with the teachings herein or it may prove convenient to construct more specialized apparatus to perform the required method steps. The required structure for a variety of these systems will appeared in the description above. In addition, the present invention is not described with reference to any particular programming language. It will be appreciated that a variety of programming languages may be used to implement the teachings of the invention as described herein.

A computer readable medium includes any mechanism for storing information in a form readable by a computer. For example, a computer readable medium includes read only memory ("ROM"), random access memory ("RAM"), magnetic disk storage media; optical storage media, flash memory devices or other type of machine-accessible storage media.

Thus, a method and apparatus for generating secure session keys has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
sending, to a first node from a second node, a first message comprising a first timestamp and a first random string;
calculating, by a processing device at the second node, a first message authentication code (MAC) using the first timestamp, the first random string, and a secret key shared between the first node and the second node;
decrypting, at the second node, a second message received from the first node in response to the first message, using the first MAC as a key to obtain a second timestamp and a second random string; and
generating, at the second node, a session key using a second MAC generated using the first timestamp, the first random string, the second timestamp and the second random string.

2. The computer-implemented method of claim 1, further comprising:
ending a session key generation process when the second timestamp exceeds a threshold value.

3. The computer-implemented method of claim 1, further comprising:
generating an acknowledgment message including a third MAC based on the first timestamp and the second timestamp encrypted using the session key.

4. The computer-implemented method of claim 1, further comprising:
generating separate distinct acknowledgment messages for each of a plurality of nodes participating in a session using a MAC specific to each of the plurality of nodes.

5. A computer-implemented method comprising:
- receiving, at a second node from a first node, a first message comprising a first timestamp and a first random string;
- calculating, by a processing device at the second node, a first message authentication code (MAC) using the first timestamp, the first random string, and a secret key shared between the first node and the second node;
- encrypting, at the second node, a second message comprising a second timestamp and a second random string using the first MAC as a key;
- sending, to the first node from the second node, the encrypted second message; and
- generating, at the second node, a session key using a second MAC generated using the first timestamp, the first random string, the second timestamp and the second random string.

6. The computer-implemented method of claim 5, further comprising:
- ending a session key generation process when the first timestamp exceeds a threshold value.

7. The computer-implemented method of claim 5, further comprising:
- decrypting an acknowledgment message including a third MAC based on the first timestamp and the second timestamp encrypted using the session key.

8. The computer-implemented method of claim 7, further comprising:
- verifying the session key by matching a decrypted value from the acknowledgment message with a known value.

9. The computer-implemented method of claim 5, further comprising:
- generating separate distinct acknowledgment messages for each of a plurality of nodes participating in a session using a MAC specific to each of the plurality of nodes.

10. A non-transitory computer readable storage medium, having instructions stored therein, which when executed, cause a processing device to perform a set of operations comprising:
- sending, to a first node from a second node, a first message comprising a first timestamp and a first random string;
- calculating, by the processing device at the second node, a first message authentication code (MAC) using the first timestamp, the first random string, and a secret key shared between the first node and the second node;
- decrypting, at the second node, a second message received from the first node in response to the first message, using the first MAC as a key to obtain a second timestamp and a second random string; and
- generating, at the second node, a session key using a second MAC generated using the first timestamp, the first random string, the second timestamp and the second random string.

11. The non-transitory computer readable storage medium of claim 10, having further instructions therein, which when executed, cause the computer to perform a further set of operations, further comprising:
- ending a session key generation process when the second timestamp exceeds a threshold value.

12. The non-transitory computer readable storage medium of claim 10, having further instructions therein, which when executed, cause the computer to perform a further set of operations, further comprising:
- generating an acknowledgment message including a third MAC based on the first timestamp and the second timestamp encrypted using the session key.

13. The non-transitory computer readable storage medium of claim 10, having further instructions therein, which when executed, cause the computer to perform a further set of operations, further comprising:
- generating separate distinct acknowledgment messages for each of a plurality of nodes participating in a session using a MAC specific to each of the plurality of nodes.

14. A non-transitory computer readable storage medium, having instructions stored therein, which when executed, cause a processing device to perform a set of operations comprising:
- receiving, at a second node from a first node, a first message comprising a first timestamp and a first random string;
- calculating, by the processing device at the second node, a first message authentication code (MAC) using the first timestamp, the first random string, and a secret key shared between the first node and the second node;
- encrypting, at the second node, a second message comprising a second timestamp and a second random string using the first MAC as a key;
- sending, to the first node from the second node, the encrypted second message; and
- generating, at the second node, a session key using a second MAC generated using the first timestamp, the first random string, the second timestamp and the second random string.

15. The non-transitory computer readable storage medium of claim 14, having further instructions therein, which when executed, cause the computer to perform a further set of operations, further comprising:
- ending a session key generation process when the first timestamp exceeds a threshold value.

16. The non-transitory computer readable storage medium of claim 14, having further instructions stored therein, which when executed perform a set of operations, further comprising:
- decrypting an acknowledgment message including a third MAC based on the first timestamp and the second timestamp encrypted using the session key.

17. The non-transitory computer readable storage medium of claim 14, having further instruction stored therein, which when executed perform a set of operations, further comprising:
- verifying the session key by matching a decrypted value from the acknowledgment message with a known value.

18. A system comprising:
- a first computer comprising:
  - a processing device; and
  - a first session key generator executable by the processing device to
    - send a first message to a second computer, the first message comprising a first timestamp and a first random string,
    - calculate a first message authentication code (MAC) using the first timestamp, the first random string, and a secret key shared between the first computer and the second computer,
    - decrypt a second message received from the second computer using the first MAC as a key to obtain a second timestamp and a second random string, and
    - generate a session key using a second MAC generated using the first timestamp, the first random string, the second timestamp and the second random string.

19. The system of claim 18, further comprising:
the second computer coupled to a network and the first computer, the second computer comprising:
- a second processing device; and
- a second session key generator executable by the second processing device to:
  generate the first MAC using the first timestamp and first string,
  reply with the second message encrypted using the first MAC as a key, and
  generate the session key using the second MAC.

20. The system of claim 18, further comprising:
a third computer coupled to the network, the third computer comprising:
a third processing device; and
a third session key generator executable by the third processing device to
generate a second session key based on a first timestamp, the second timestamp, a third timestamp, the first random string, the second random string and a third random string based on a third message received from the second computer.

* * * * *